(12) United States Patent
Lee et al.

(10) Patent No.: US 8,880,221 B2
(45) Date of Patent: Nov. 4, 2014

(54) DAMAGE REDUCTION CONTROL FOR HUMANOID ROBOT FALL

(75) Inventors: Sung-Hee Lee, Gwangju (KR); Ambarish Goswami, Fremont, CA (US)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 13/425,404

(22) Filed: Mar. 20, 2012

(65) Prior Publication Data

US 2012/0245735 A1    Sep. 27, 2012

Related U.S. Application Data

(60) Provisional application No. 61/454,937, filed on Mar. 21, 2011.

(51) Int. Cl.
| | | |
|---|---|---|
| *G05B 19/04* | (2006.01) | |
| *G05B 19/18* | (2006.01) | |
| *B62D 57/032* | (2006.01) | |

(52) U.S. Cl.
CPC .... *B62D 57/032* (2013.01); *G05B 2219/40427* (2013.01); *G05B 2219/40512* (2013.01)
USPC ........... 700/255; 700/245; 700/253; 700/254; 700/258; 700/260; 318/568.12; 318/568.22

(58) Field of Classification Search
USPC ......... 700/245, 253, 254, 255, 258, 260, 263; 318/567, 568.12, 568.22, 590, 591, 318/630, 632
See application file for complete search history.

(56) References Cited

U.S. PATENT DOCUMENTS

| | | | |
|---|---|---|---|
| 6,902,015 B2 | 6/2005 | Furuta et al. | |
| 6,992,455 B2 | 1/2006 | Kato et al. | |
| 7,493,192 B2 * | 2/2009 | Takenaka et al. | 700/260 |
| 8,369,991 B2 * | 2/2013 | Goswami et al. | 700/253 |
| 8,554,370 B2 * | 10/2013 | Goswami et al. | 700/253 |
| 2002/0116091 A1 * | 8/2002 | Yamamoto | 700/261 |
| 2004/0060746 A1 * | 4/2004 | Furuta et al. | 180/8.6 |
| 2004/0236469 A1 | 11/2004 | Moridaira et al. | |
| 2005/0055131 A1 * | 3/2005 | Mikami et al. | 700/245 |
| 2005/0113973 A1 * | 5/2005 | Endo et al. | 700/245 |
| 2006/0241809 A1 * | 10/2006 | Goswami et al. | 700/245 |
| 2007/0016329 A1 * | 1/2007 | Herr et al. | 700/250 |
| 2008/0133053 A1 * | 6/2008 | Pratt et al. | 700/245 |
| 2010/0042256 A1 | 2/2010 | Takenaka et al. | |

(Continued)

OTHER PUBLICATIONS

Nagarajan et al., Generalized Direction Changing Fall Control of Humanoid Robots, 2010 IEEE International Conference on Robotics and Automation, Anchorage Convention District, May 3-8, 2010, Anchorage, Alaska, USA, pp. 3316-3322.*

(Continued)

*Primary Examiner* — Dalena Tran
*Assistant Examiner* — Jaime Figueroa
(74) *Attorney, Agent, or Firm* — Fenwick & West LLP; Mark Duell (57) ABSTRACT

A humanoid robot fall controller controls motion of a robot to minimize damage when it determines that a fall is unavoidable. The robot controller detects a state of the robot during the fall and determines a desired rotational velocity that will allow the robot to re-orient itself during the fall to land on a predetermined target body segment (e.g., a backpack). The predetermined target body segment can be specially designed to absorb the impact of the fall and protect important components of the robot.

20 Claims, 10 Drawing Sheets

(56) References Cited

U.S. PATENT DOCUMENTS

2010/0057253 A1    3/2010   Kwon et al.
2010/0070076 A1*   3/2010   Zaier ............................. 700/245
2010/0179668 A1*   7/2010   Herr et al. ........................ 623/51

OTHER PUBLICATIONS

Kalyanakrishnan et al., Predicting Falls of a Humanoid Robot through Machine Learning, Jul. 2010, To appear in Proceedings of the Twenty-second IAAI Conference on Artificial Intelligence, Atlanta, GA, USA, pp. 1-6.*

Kalyanakrishnan et al, Learning to Predict Humanoid Fall, 2011, International Journal of Humanoid Robotics vol. 8, No. 2 (2011) 245-273 World Scientific Publishing Company, DOI: 10.1142/S0219843611002496, pp. 245-273.*

Fujiwara, K. et al., "An Optimal Planning of Falling Motions of a Humanoid Robot," *Proceedings of the 2007 IEEE/RSJ International Conference on Intelligent Robots and Systems*, Oct. 29-Nov. 2, 2007, pp. 456-462, San Diego, CA.

Fujiwara, K. et al., "UKEMI: Falling Motion Control to Minimize Damage to Biped Humanoid Robot," *Proceedings of the 2002 IDDD/RSJ International Conference on Intelligent Robots and Systems*, Oct. 2002, pp. 2521-2526, Lausanne, Switzerland.

PCT International Search Report and Written Opinion, PCT Application No. PCT/US2012/29874, Jul. 11, 2012, five pages.

Yun, S-K. et al., "Safe Fall: Humanoid robot fall direction change through intelligent stepping and inertia shaping," *IEEE International Conference on Robotics and Automation*, May 12-17, 2009, pp. 781-787, Kobe, Japan.

\* cited by examiner

DAMAGE REDUCTION CONTROL FOR HUMANOID ROBOT FALL

RELATED APPLICATIONS

This application claims priority from U.S. provisional application No. 61/454,937 entitled "Fall on backpack: Damage Minimizing Humanoid Fall on Targeted Body Segment Using Momentum Control" filed on Mar. 21, 2011, the content of which is incorporated by reference herein in its entirety.

BACKGROUND

1. Field of the Invention

The present invention relates to legged robotics and, more specifically, to reducing damage to a humanoid robot resulting from a fall.

2. Description of the Related Arts

Humanoid and other legged robots presently operate primarily in controlled laboratory environments. However, as humanoid robots migrate into free and physically interactive surroundings containing objects and people, the issues of safety and robust operation will become a major concern. In physically interactive human environments, a catastrophic fall is a major threat to safe and smooth operation of humanoid robots and safety of objects and people in their surroundings. While humanoid robots may be designed to take measures to avoid such falls, in some cases the fall is inevitable and cannot be prevented. In these cases, it is desirable that humanoid robots be equipped with a comprehensive fall management strategy to minimize damage to itself and injuries to others. However, fall control presently remains an understudied and overlooked aspect of conventional humanoid technology.

SUMMARY

In a first embodiment, a computer-implemented method controls a humanoid robot during a fall. A state of the robot is detected. Based on the detected state, a robot controller determines that a fall of the robot is unavoidable. Responsive to determining that the fall of the robot is unavoidable, a desired rotational velocity of the robot is determined that would cause the robot to impact the ground with a predetermined target body segment. A control signal is generated to control motion of the robot during the fall based on the desired rotational velocity. The control signal is outputted to actuators of the robot.

In one embodiment, the desired rotational velocity of the robot is determined during a planning stage. In this stage, the robot controller estimates a time to a moment of impact of the target body segment with the ground based on the detected state of the robot. An orientation of the target body segment at the moment of impact is estimated for the condition when the robot joints are locked during the fall. The desired rotational velocity is determined based on the estimated time to the moment of impact and the estimated orientation.

In one embodiment, the control signal is generated during an execution stage. In this stage, the robot controller determines desired joint accelerations and a desired ground reaction force based on the desired rotational velocity. Joint torques are determined for achieving the desired joint accelerations and the desired ground reaction force. The control signal is generated that represents the determined joint torques.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments are intended to be illustrative, but not limiting, of the scope of the embodiments, which are set forth in the claims.

Overview

A robot controller controls motion of a robot to attempt to minimize damage to the robot in response to an unavoidable fall. The robot controller employs a control strategy that attempts to re-orient the robot during the fall such that it impacts the ground with a predetermined target body segment. The predetermined target body segment may be chosen as one that will result in minimal damage to the robot. For example, the predetermined body segment may employ impact-absorbing materials designed to absorb the impact of the fall. Furthermore, the robot may be designed such that the predetermined body segment is substantially isolated from the most critical and/or costly components of the robot so that these components are least likely to be damaged.

In general, the control framework described herein can be applied to cause a robot to fall on any targeted body segment through the use of dynamic coupling between different limb segments. However, for the purpose of example, a specific embodiment is described in detail in which the robot controller controls the robot to fall on its backpack. Other possible fall strategies may include falling on the robot's hip, knee, hands, elbows, etc.

Figure 1A:
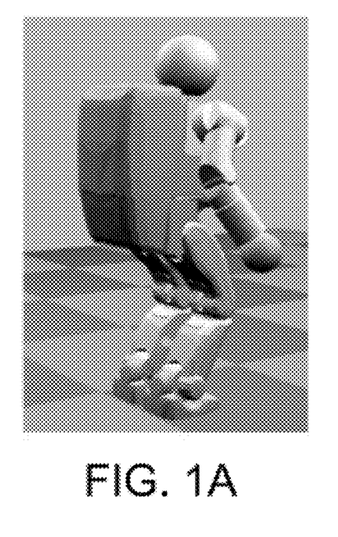
FIG. 1A is an illustration of a standing humanoid robot in accordance with an embodiment of the invention.
Figure 1B:
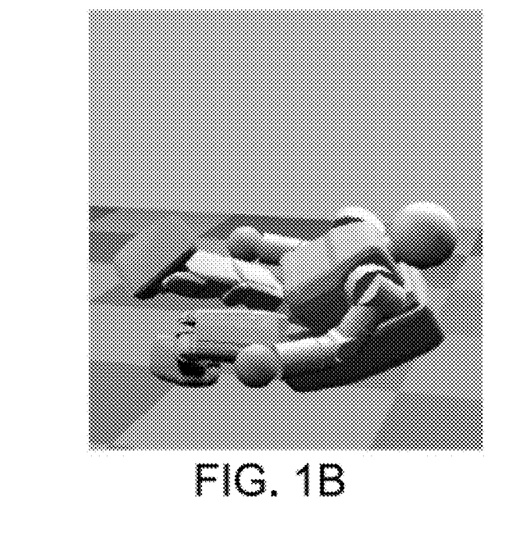
FIG. 1B is an illustration of a human robot making contact with the ground after a fall in accordance with an embodiment of the invention.

FIG. 1A-1B illustrate an example of a humanoid robot with a backpack as a prominent protruding feature. In FIG. 1A a robot is illustrated with a backpack rigidly attached to the back of its trunk. Due to its design and three-dimensional profile, the backpack would come into frequent contact with the ground if the robot were to fall. The backpack can be properly designed to prevent the effect of the impact propagating to other, more fragile, components. For example, the backpack may be designed with a shock resistive internal frame to absorb the impact of a fall.

In FIG. 1B, the desired fall strategy is illustrated with the robot impacting the ground with the backpack. As described herein, the robot controller can control the robot to fall on the backpack even when the robot starts falling in a different direction (e.g., when it starts falling sideways).

Fall Control Framework

The control objective of the robot during the fall can be divided into two parts: the first is to ensure that all other body parts, except the feet, are above the ground during touchdown and the second is to re-orient the trunk so that the backpack faces the ground at touchdown. The first objective implies that the backpack is the first to touch the ground and is mainly meant to keep the arms out of the way. To achieve this, the robot may maintain or return the arms to a default pose of keeping the hands naturally positioned in front of the pelvis. This ensures that the arms will be located above the ground when the robot makes impact.

To achieve the second objective, the robot's motion is controlled during the fall to achieve a desired orientation of the robot at touchdown time. In order to re-orient the trunk so that the robot touches the ground with the backpack, the robot takes into account the dynamic coupling among the body parts of the falling robot. For example, by moving other parts of the robot, the robot attempts to indirectly control the trunk orientation.

Figure 2A:
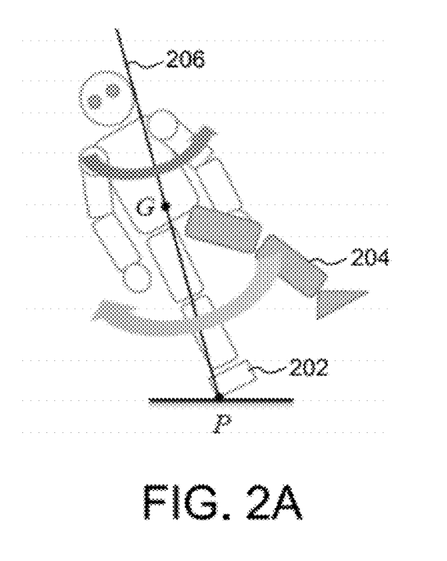
FIG. 2A illustrates a momentum control technique using a swing leg in accordance with an embodiment of the invention.
Figure 2B:
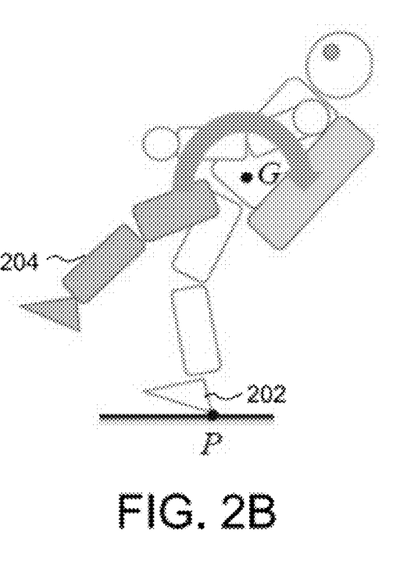
FIG. 2B illustrates a control technique by backward bending of a robot to facilitate ground contact with its backpack in accordance with an embodiment of the invention.

FIGS. 2A-B illustrate two types of motion that the robot may attempt to apply in order to re-orient itself during the fall. First, in FIG. 2A, the robot may perform a rotation of its swing leg during the fall to achieve a counter-rotation of the trunk. Second, in FIG. 2B, the robot may bend the trunk backwards during the fall to increase the probability of touching down with the backpack.

As seen in FIGS. 2A-B, one foot of the robot will be in contact with the floor (referred to as the support leg 202) during a typical sideways fall, while the other will be free (referred to as the swing leg 204). As illustrated in FIG. 2A, the inertial effect of the rotating swing leg 204 may be used to indirectly control the trunk orientation. Here, the "lean line" 206 of the robot is the line connecting the center of pressure (CoP) P and the center of mass (CoM) G. As the robot is falling, the ground reaction force (GRF) and gravity are the only external forces applied to the robot if the support foot 202 and the ground is modeled as a point contact and the rotational friction between the foot 202 and the ground is approximated to be zero. The angular momentum of the falling robot about the lean line 206 is conserved because all external forces have zero moment-arms from the lean line 206. This behavior is similar to that of a rotating top where the angular momentum about the spin axis is conserved. Falling humanoids are not expected to attain angular velocity of too large magnitude about the spin axis; thus the precession effect that can be observed in a rapidly spinning top can be ignored here. Therefore a change of angular velocity of the trunk about the lean line 206 can be achieved by rotating other body parts in the opposite direction. On the other hand, due to the ground contact, the angular momentum in the other directions is not preserved and can be changed.

The lean line 206 plays an important role as the spin axis. Since the gravity and the GRF do not create torques about the spin axis as they both intersect it, the corresponding component of the angular momentum is preserved. This means that the spin angle of the trunk can be controlled by rotating some other member, such as the swing leg 204, about the spin axis. However, because the swing leg rotation is constrained by joint limits, the robot may not always be able to attain the desired trunk orientation only through this means. To increase the chance of falling on the backpack, an additional heuristic measure of bending the trunk backward may also be applied as illustrated in FIG. 2B. These fall strategies will be described in further detail below.

System Architecture

Figure 3:
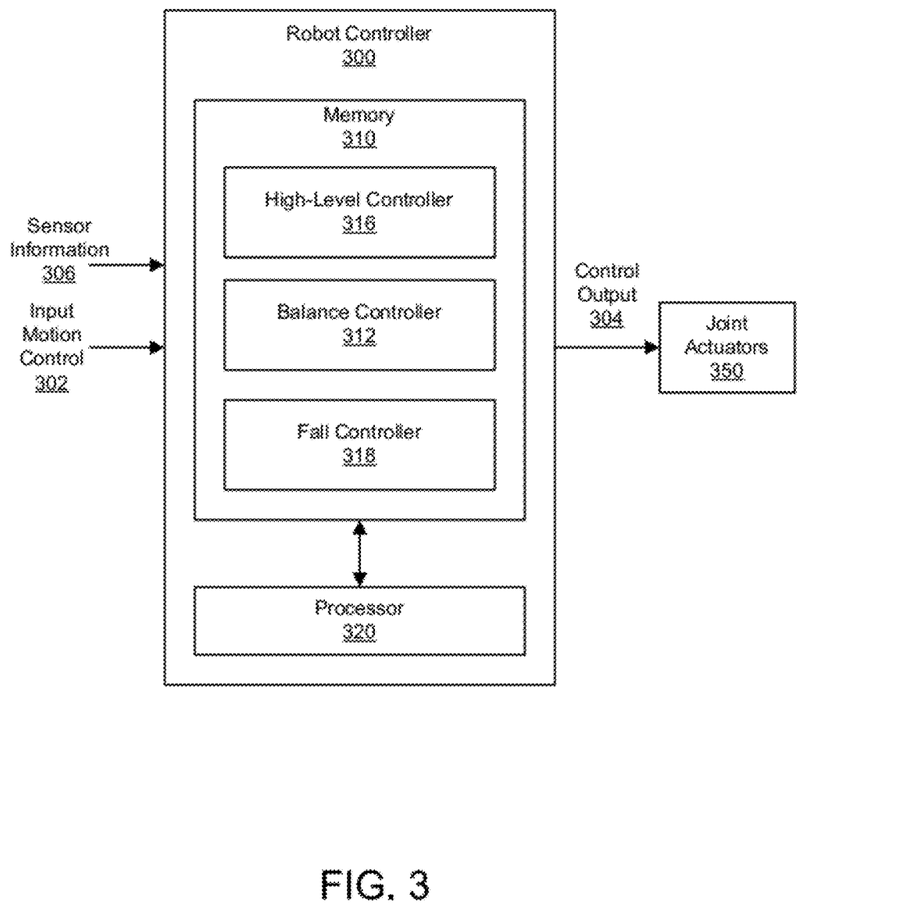
FIG. 3 is a block diagram illustrating a robot controller in accordance with an embodiment of the invention.

FIG. 3 is a block diagram illustrating an embodiment of a robot controller 300 for controlling motion of a robot. In one embodiment, the robot is a humanoid biped robot having a human-like joint configuration (e.g., six degrees of freedom in each leg) and a total mass of, for example, between 40 and 60 kgs. In alternative embodiments, the robot may be a legged robot having more than two legs (e.g., a quadruped, hexapod, etc.) or the robot may be a biped robot which is not necessarily humanoid (e.g., a bird-like robot, a robot without an upper body, etc.). The robot controller 300 receives a motion control input 302 specifying a desired motion of the robot. The motion control input 302 may be derived, for example, from general instructions for the robot (e.g., walk 10 feet to the left, walk down stairs, stand still, etc.). In some situations, the motion control input 302 can indicate that the robot should remain stationary (i.e., the desired angular momentum and center of mass velocity are zero). The robot controller 300 also receives sensor information 306 from various sensors of the robot. For example, the sensor information 306 may comprise positions and orientations of the trunk and its linear and angular velocities, information relating to the location of the CoP, and joint angles and/or velocities of for the different joints of the robot. These values can be measured or computed from sensors in the robot such as gyroscopes, accelerometers, and joint encoders. Based on the desired motion and a sensed state of the robot, the robot controller 300 generates a control output 304 that controls joint actuators 350 which cause the robot to move. In one embodiment, the control output 304 comprises a vector of joint torques indicating the torques that the actuators will apply to each of the robot's joints.

The robot controller 300 attempts to control the robot to carry out the desired motion specified by the motion control input 302 (which may be remaining stationary) even in response to external disturbances such as a push. In some cases, the robot cannot achieve the motion specified by the motion control input 302 due to balance constraints or physical limitations of the robot, particularly in response to an external disturbance. In this case, the robot controller 300 instead attempts to control the robot to achieve an admissible motion that is optimally close to the motion specified by the motion control input 302 while still allowing the robot to maintain balance. For example, in response to a push, the robot may make a postural change or take a step to maintain balance. In the case that the robot cannot take any action to maintain balance, the robot controller 300 attempts to control the robot to fall in the safest manner possible (e.g., by controlling the robot to fall on a predetermined body segment designed to take the impact).

In one embodiment, the robot controller 300 comprises a processor 320 and a memory 310. The processor 320 processes data signals and may comprise various computing architectures such as a complex instruction set computer (CISC) architecture, a reduced instruction set computer (RISC) architecture, or an architecture implementing a combination of instruction sets. Although only a single processor 320 is shown in FIG. 3, multiple processors may be included. The processor 320 comprises an arithmetic logic unit, a microprocessor, a general purpose computer, or some other information appliance equipped to transmit, receive and process electronic data signals from the memory 310 or from external inputs.

The memory 310 comprises a computer-readable storage medium that stores computer-executable instructions and computer-readable data. The instructions may comprise code for performing any and/or all of the techniques described herein. The memory 310 may furthermore temporarily or persistently store data inputted to the robot controller 300 (e.g., motion control input 302 and or sensory information 306), data to be outputted by the robot controller 300 (e.g., control output 304), and any intermediate data used to carry out the process steps of the robot controller 300 described herein. Memory 304 may be a dynamic random access memory (DRAM) device, a static random access memory (SRAM) device, Flash RAM (non-volatile storage), combinations of the above, or some other memory device known in the art. In operation, the processor 320 loads the computer-executable instructions and/or data from the memory 310 to carry out the process steps described herein.

In one embodiment, the memory 310 stores computer-executable instructions embodied as a high-level controller 316, a balance controller 312, and a fall controller 318. The high-level controller 316 determines whether motion of the robot is controlled by the balance controller 312 or the fall controller 318. Generally, the high-level controller 316 gives control to the balance controller 312 when the high-level controller 316 determines that the robot can maintain balance. For example, the high-level controller 316 gives control to the balance controller 312 when the robot can achieve the motion specified by the motion control input 302 or when the robot can take a different action to maintain balance. In one embodiment, the balance controller 312 is a momentum-based controller that controls the robot to achieve an admissible motion as close as possible to the desire motion, while still acting within the physical limitations of the robot and ensuring that the robot maintains balance. For example, the balance controller 312 may cause the robot to change its postural state or take a step in order to maintain balance in response to an external disturbance such as a push. The high-level controller 316 generally gives control to the fall controller 318 when it detects that a fall is unavoidable despite the efforts of the balance controller 312 to maintain balance. For example, in one embodiment, the high-level controller 316 gives control to the fall controller 318 when the angle between the lean line and the ground normal direction exceeds a threshold (e.g., 15 degrees). The fall controller 318 controls the robot to redistribute angular momentum among the robot limbs through dynamic coupling to attempt to re-orient the robot during the fall so that it lands on the desired target body segment (e.g., the backpack).

The robot controller 300 may include more or less components than those shown in FIG. 3 without departing from the scope of the present invention. For example, computer system 300 may include additional memory, such as, for example, a first or second level cache, or one or more application specific integrated circuits (ASICs). In other embodiments, the robot controller 300 may be implemented entirely in hardware.

Figure 4:
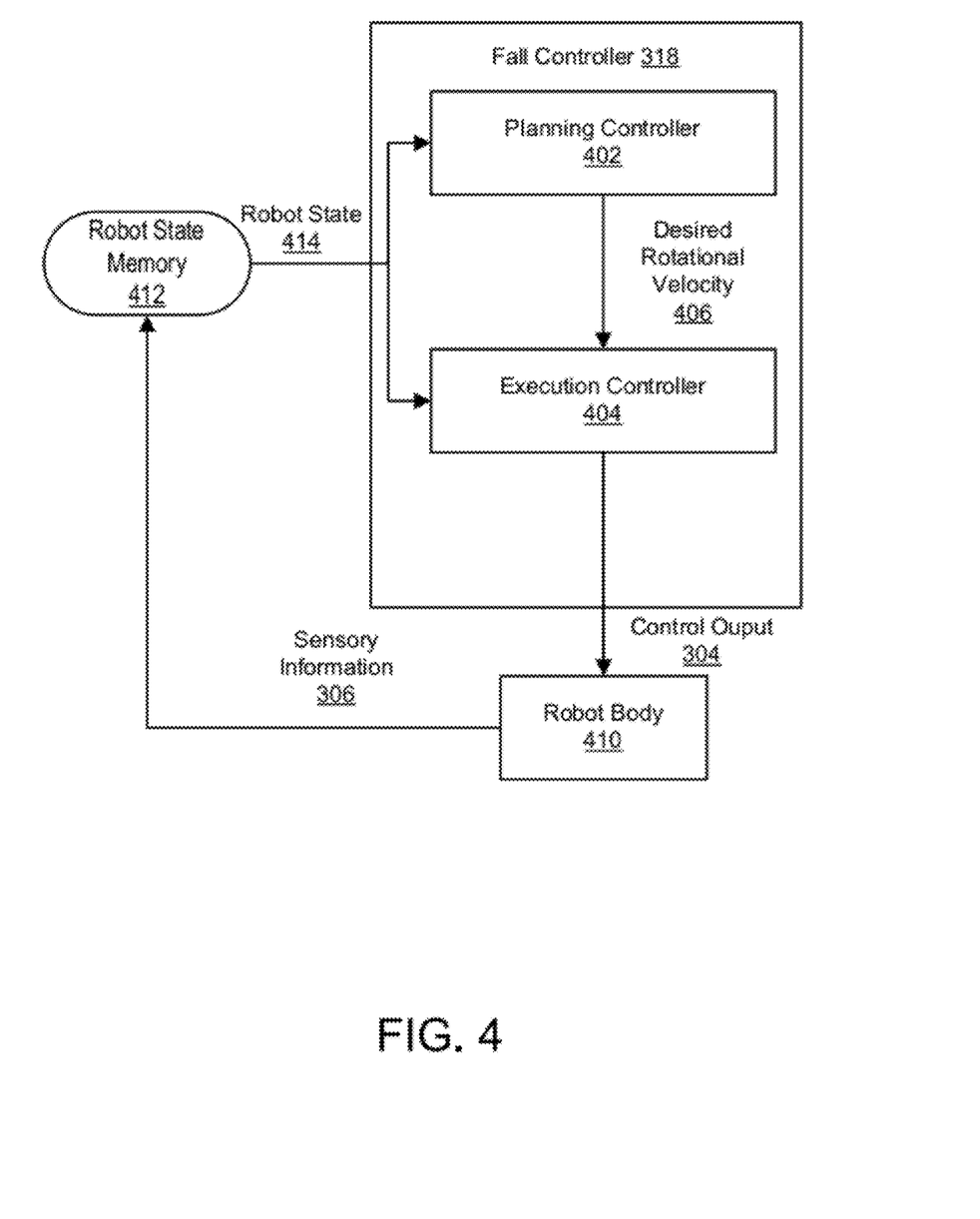
FIG. 4 is a block diagram illustrating a fall controller in accordance with an embodiment of the invention.

FIG. 4 illustrates an embodiment a fall controller 318 for use with a robot. The fall controller 218 comprises a planning controller 402 and an execution controller 404. When the robot detects an impending inevitable fall, the planning controller 402 first plans how to fall. Specifically, in order to determine how to make the robot impact the ground with the backpack, the planning controller 402 receives information about the robot state 414 (e.g., from a robot state memory 412) and determines the rotational velocity 406 of the trunk to achieve the desired fall trajectory given the current robot state 414. In one embodiment, the planning controller 402 executes the planning steps periodically (e.g., approximately once every 50-100 ms) during the fall to update the desired rotational velocity 406 of the trunk while the robot is falling. The execution controller 404 periodically determines the joint acceleration and torques to realize the rotational velocity 406 based on the robot's current state 414, and provides a control output 304 to control actuators of the robot body 410 to attempt to achieve the determined joint accelerations and torques. In one embodiment, the period for re-determining the control output 304 is substantially shorter than the period for determining the rotational velocity 406. The robot state memory 412 can store various parameters describing the robot's positional and/or dynamic state such as, for example, the positions and orientations of the trunk and its linear and angular velocities, the joint angles and velocities, information about the CoM and CoP, etc. In one embodiment, the robot memory state 412 is updated periodically (e.g., once per period of the execution controller 404) based on sensory information 306 received from sensors on the robot body 410.

Planning Stage of Fall Control

Figure 5:
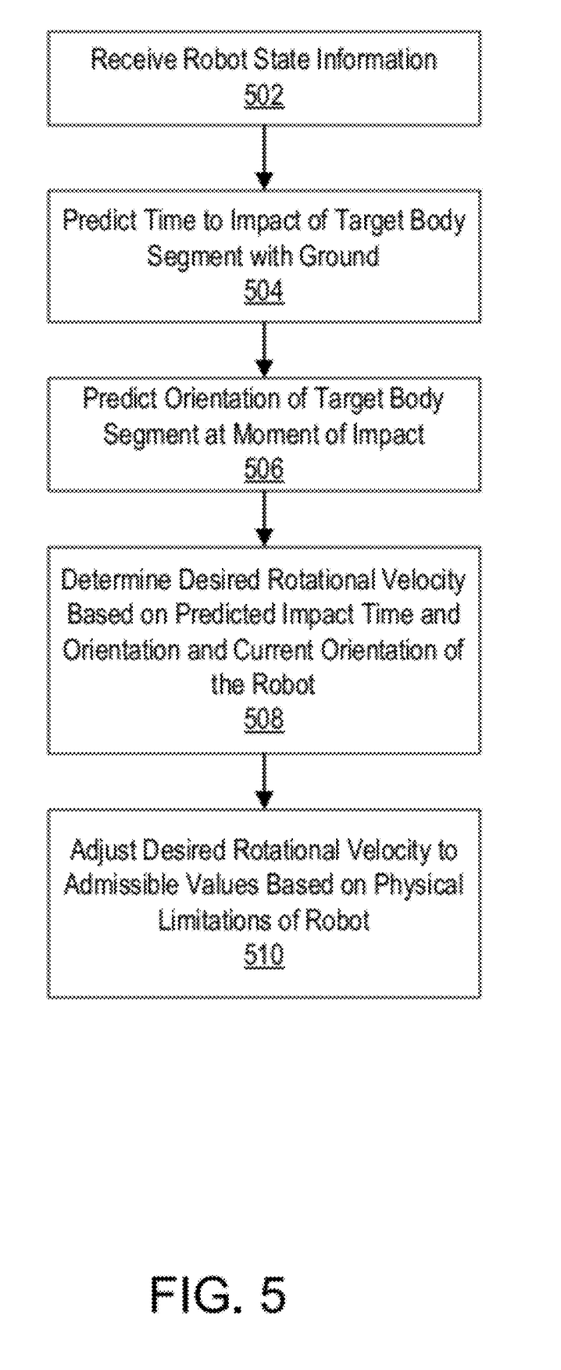
FIG. 5 is a flowchart illustrating a planning stage for controlling motion of a robot during a fall in accordance with an embodiment of the invention.

FIG. 5 illustrates an embodiment of a planning stage executed by the planning controller 318. The planning stage executes when the robot controller 300 detects that a fall is inevitable and control is given to the fall controller 318. During the planning stage, the planning controller 402 receives 502 state information of the robot (e.g., joint angles and/or velocities). The planning controller 402 then predicts 504 the time to impact of the target body segment (e.g., the backpack) with the ground and predicts 506 the expected orientation of the target body segment (e.g., the backpack) assuming a locked joint configuration (i.e., how the robot would fall if not control actions are taken). Given these predictions and the current state of the robot, the planning controller 402 then determines 508 a desired rotational velocity of the robot that will achieve the control objective of impacting the ground with the desired target body segment. Due to the physical limitations of the robot, the desired rotational velocity may not always be achievable. Therefore, the planning controller 402 adjusts 510 the desired rotational velocity to admissible values that the robot can actually achieve. For example, in one embodiment, the planning controller 402 determines the admissible rotational velocity that is optimally close to the desired rotational velocity. Note that the desired rotational velocity may be a vector describing rotational velocities with respect to a plurality of different axes (e.g., a sagittal axis, a frontal axis, and a vertical axis). In one embodiment, the planning stage can be executed multiple times (e.g., periodically) during the fall to obtain updated estimates and output these estimates as they are computed.

Figure 6:
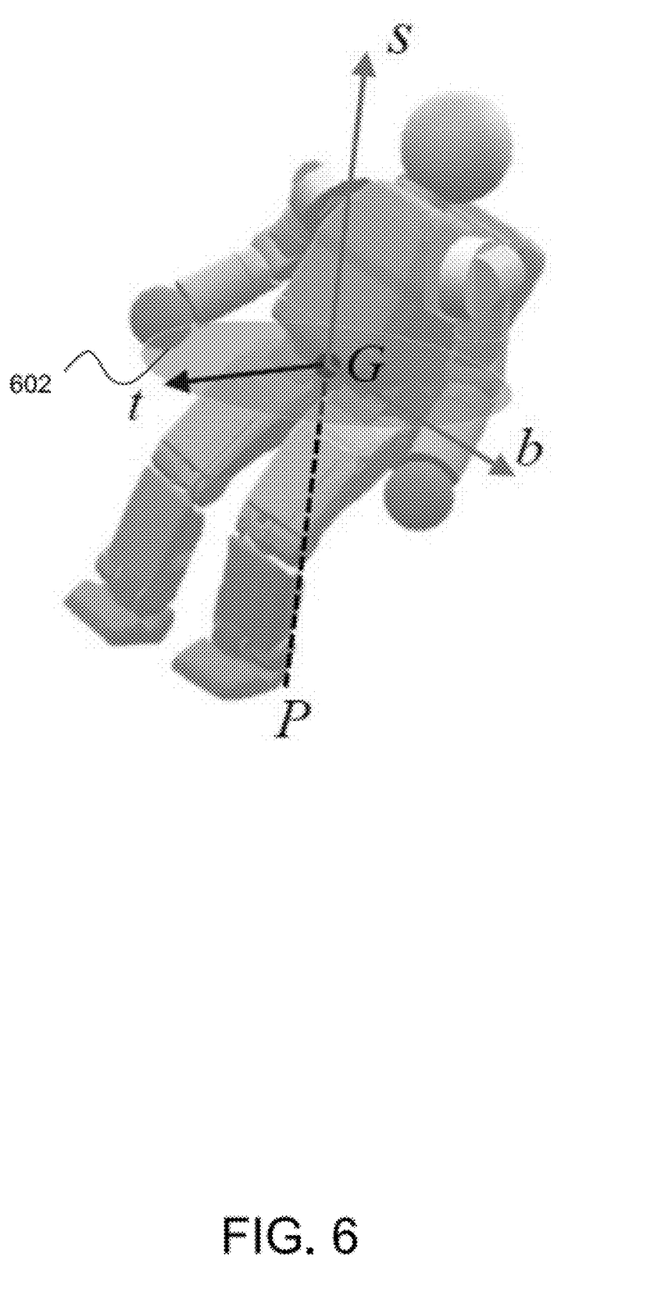
FIG. 6 is a diagram illustrating spin frame of a robot in accordance with an embodiment of the invention.

To obtain the estimates described above, a spin frame of the robot is defined and centroidal dynamics of the robot are described with respect to this reference frame. FIG. 6 illustrates a spin frame 602 of a robot located at the CoM (G) and defined by the axes $\{t, b, s\}$ correspond to frontal, bending, and spin, respectively. The spin axis s coincides with the lean line GP. The frontal axis t is given by the intersection of the sagittal plane of the trunk and the plane normal to s. The torso bending direction b is given by s×t. The centroidal angular momentum k, which is the aggregate angular momentum of a robot projected at its CoM, and the generalized velocity vector $\dot{q}$ have the linear relations as follows:

$$k = K\dot{q} \qquad (1)$$

where k is a 3×1 vector and, for a robot with n joints, $\dot{q} \in \mathbb{R}^{n+6}$ is the generalized velocity vector and $K \in \mathbb{R}^{3 \times (n+6)}$ transforms the generalized velocity vector to angular momentum. K is called the centroidal momentum matrix if k refers to the angular momentum about CoM. To extract the motion of the link of interest (e.g., the trunk) $\dot{q} = (\omega, \upsilon, \dot{\theta})$ is divided into the angular and linear velocities of the trunk $(\omega, \upsilon)$ and the joint velocity vector $\dot{\theta} \in \mathbb{R}^n$. Then Eqn. (1) is expanded as:

$$k = K_w \omega + K_v \upsilon + K_\theta \dot{\theta} \qquad (2)$$

where $K_w$, $K_v$, and $K_\theta$ are sub-matrices of K corresponding to $\omega$, $\upsilon$, and $\dot{\theta}$ respectively. If k, $\omega$, and $\upsilon$ are expressed with respect to the spin frame (or, more specifically, a fixed frame that coincides with the spin frame instantaneously), the linear term vanishes because the spin frame is located at the CoM and the linear velocity of the trunk $\upsilon$ does not affect k:

$$k = K_w \omega + K_\theta \dot{\theta} \qquad (3)$$

where $K_w$ is the locked rotational inertia of the robot, given by a symmetric positive definite matrix. The spin component $k_s$ of $k = (k_t, k_b, k_s)$ will be discussed in further detail below.

Touchdown Time and Trunk Orientation Estimation

In order to control the orientation of the backpack so that it hits the ground first, it is beneficial to know when the robot will collide with the ground. Although the exact time of touchdown depends on the movement of the robot, a rough estimate can be obtained based on a simplified model of the robot. For faster computation, all the joints of the robot can be approximated as being locked, such that the entire robot is treated as a single rigid body. The motion of the rigid body is modeled until it collides with the ground. Specifically, the rigid body is modeled as rotating about the robot's CoP with the initial angular velocity being the same as that of the robot trunk. The spin component of the angular velocity is denoted as $\omega_{s,0}$. A dynamic model tracks the orientation of the rigid body until the height of CoM falls below a threshold $h_t$, approximating the collision between the robot and the ground, and estimates the duration of fall $t_f$. For example, in one embodiment, $h_t$ is set to about one third of the height of CoM of the robot standing with the default pose, although other values of $h_t$ may be used. Furthermore, in one embodiment, the orientation of the backpack at touchdown is estimated. This corresponds to the backpack orientation if the robot did not take any action i.e., if the robot locked all its joints during fall. The estimates of the duration of the fall $t_f$ and the orientation of the robot are used to determine the desired trunk angular velocity estimation described below.

Desired Trunk Angular Velocity Estimation

Figure 7:
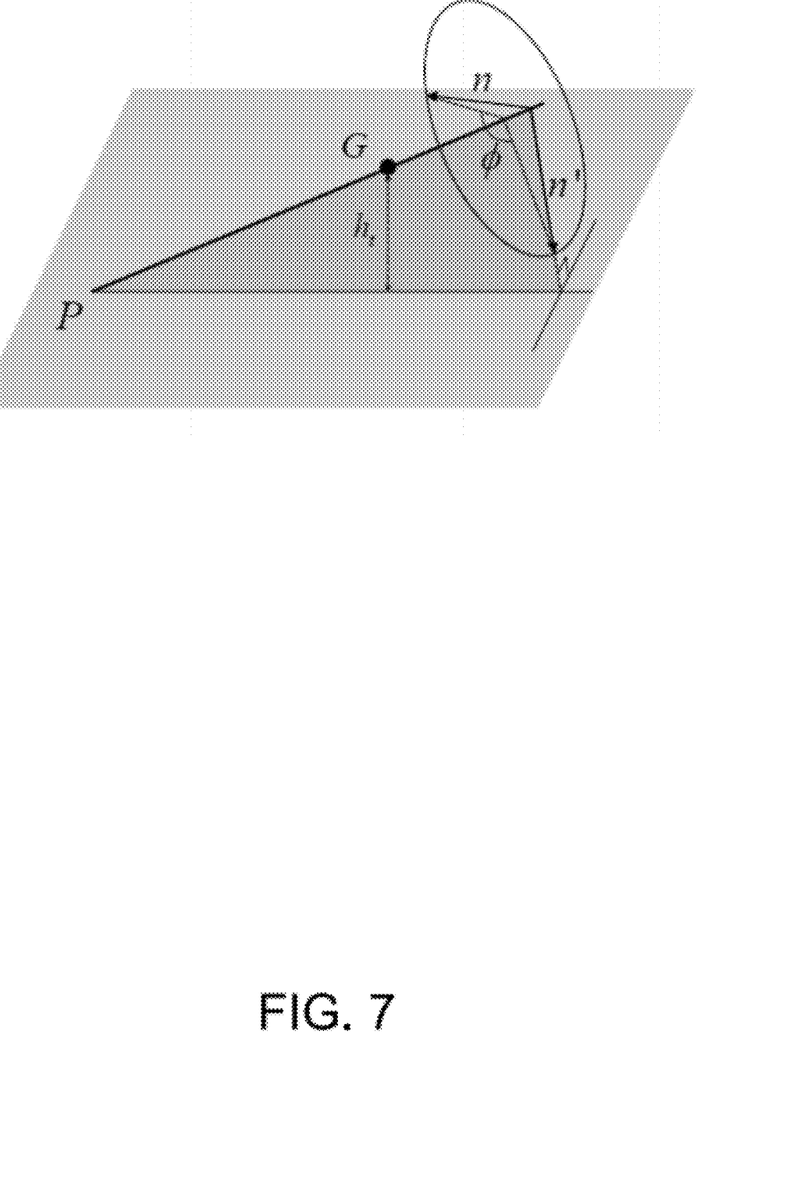
FIG. 7 is a diagram illustrating a motion model of a falling robot in accordance with an embodiment of the invention.

In the general case, the robot backpack has an overall design that can effectively block shock propagation to other body parts regardless of the specific location of the collision point. In this embodiment, the robot controller operates with the goal of having the backpack be the first segment to touch the ground, but treats all points on the backpack as equally desirable first impact points. In other words, any sagittal plane orientation of the trunk during the ground contact is taken as acceptable. To achieve this, the fall controller 318 tries to orient a vector n, (which is normal to the backpack and points backward from the trunk) in such a way that the plane made by GP and n is normal to the ground. This would ensure that the backpack is facing the ground regardless of the actual orientation of n in the sagittal plane. FIG. 7 illustrates a model of a falling robot as a single rigid body by locking all the joints. The time to fall $t_f$ and the vector n representing the normal direction point backward from the backpack are estimated at the point where the CoM drops down to a height $h_t$. Here, n is not necessarily orthogonal to the lean line GP. The direction of n' is the desired value of n determined by rotating n about the lean line such that the plane made by GP and n' is orthogonal to the ground plane.

Figure 8:
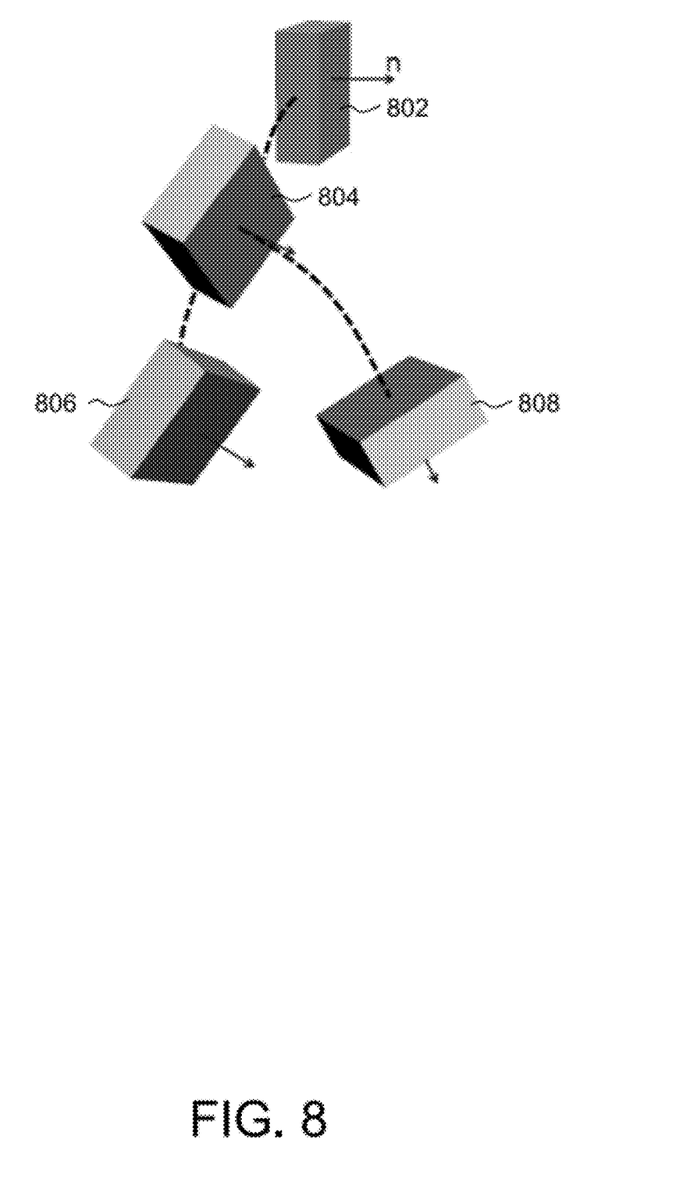
FIG. 8 is a diagram illustrating a bending strategy for fall control of a robot in accordance with an embodiment of the invention.

In order to orient the vector n so that the plane made by GP and n is normal to the ground at impact, the fall controller 318 may employ both rotational and/or backward bending motion of the robot as shown in FIG. 2A-B discussed above. FIG. 8 illustrates how a bending strategy helps the robot achieve its control objective of falling on the backpack. Box 802 represents the position of the backpack when the robot is standing upright. Box 804 illustrates the orientation of the backpack when the fall controller is activated, when the robot controller determines that a fall is unavoidable. Box 806 illustrates the position of the backpack when only a spinning strategy is employed. Box 808 shows the position when both a spinning and bending strategy is employed. As can be seen the bending strategy make n more orthogonal to the ground at impact.

Given the estimated normal vector n at the time of touchdown, the spin angle $\phi$ is determined that achieves a rotation of n about the spin direction to the desired vector n' (See FIG. 7). Then $$\frac{\phi}{t_f}$$

represents the "additional spin velocity" that the robot should have had to fall on its backpack. Therefore, the desired spin velocity $\omega_{s,d}$ is determined as:

$$\omega_{s,d} = \omega_{s,0} + \frac{\phi}{t_f} \quad (4)$$

where $\omega_{s,0}$ is the initial value of the spin component of angular velocity of the trunk at the preview stage, which remains constant during the simulation, and $t_f$ is the estimated duration of fall that was computed previously. However, $\omega_{s,d}$ may not be physically attainable due to limits on joint angles and velocities of the swing leg. Therefore, an admissible value may be determined. To this end, the third row of the momentum relation of Eqn. (3) may be used:

$$k_s = K_{w(3,1)}\omega_f + K_{w(3,2)}\omega_b + K_{w(3,3)}\omega_s + K_\theta \dot{\theta} \quad (5)$$

The spin component of the angular momentum $k_s$ is conserved because no external forces can induce torques about the spin axis. To simplify Eqn. (5), the following approximations may be made: 1) The contributions of frontal and bending components of angular velocity to $k_s$ are negligible, i.e., $K_{w(3,1)}\omega_f \approx 0, K_{w(3,2)}\omega_b \approx 0$; and 2) only the joint velocities of the hip and knee joints of the swing leg make appreciable contribution to the spin. Then Eqn. (5) is approximated as:

$$k_s \approx K_{w(3,3)}\omega_s + K_{swg}\dot{\theta}_{swg} \quad (6)$$

where $\dot{\theta}_{swg}$ is the joint velocity vector of the swing leg. The possible range of $\omega_s$ is determined from the constraints on joint angles and velocities of the swing leg:

$$\omega_s^l \leq \omega_s \leq \omega_s^u, \quad (7)$$

where $$\omega_s^l = \min \frac{k_s - K_{swg}\dot{\theta}_{swg}}{K_{w(3,3)}} \quad (8)$$

$$\omega_s^u = \max \frac{k_s - K_{swg}\dot{\theta}_{swg}}{K_{w(3,3)}} \quad (9)$$

The extrema of $\dot{\theta}_{swg}$ of each joint are determined from the lower and upper limits on joint angle and velocity as well as the current joint angle. For example, the maximum velocity that a joint $\dot{\theta}_i$ can have is set to be $\min(\dot{\theta}_i^u, (\theta_i^u - \theta_i)/t_f)$ where $\theta_i^u$ and $\dot{\theta}_i^u$ are the upper limits for joint angle and velocity.

If the desired spin velocity is within the range, the admissible spin velocity $\omega_{s,a}$ can be set to the desired value. Otherwise, the admissible spin velocity $\omega_{s,a}$ is clipped to either $\omega_s^l$ or $\omega_s^u$.

Next, the desired bending velocity is determined. If the desired spin velocity is admissible, the robot will be able to touchdown with the backpack without rotating the trunk backward. If the difference between the desired value and the admissible value of the spin velocity is large, the robot would have to rotate backward to increase the chance of falling on the backpack as illustrated in FIG. 8. Using this rationale, a heuristic method may be used to determine the backward-bending velocity to be proportional to the difference of the admissible spin velocity $\omega_{s,a}$ and the desired spin velocity $\omega_{s,d}$:

$$\omega_b = -c|\omega_{s,a} - \omega_{s,d}|, \quad (10)$$

where c is a scaling factor. For example, in one embodiment, c=3. Altogether, the desired angular velocity of the trunk is set as follows:

$$\omega_d = (0, \omega_b, \omega_{s,a}) \quad (11)$$

The first component of $\omega_d$ is set to zero in Eq. (11) to reduce the rotational component which is not particularly related to the described control strategy.

Execution Stage of Fall Control

Figure 9:
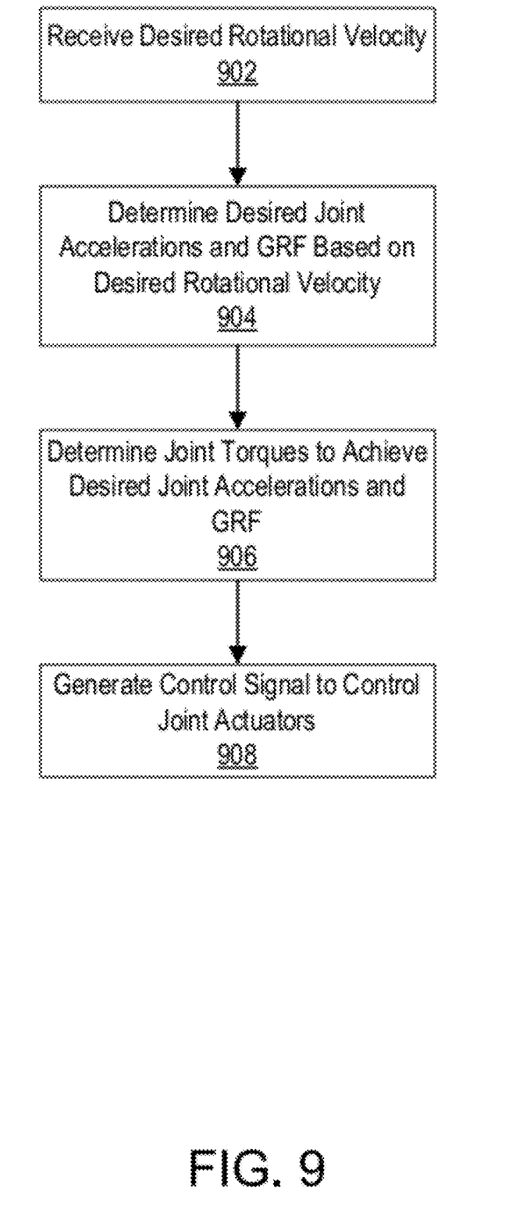
FIG. 9 is a flowchart illustrating an execution stage for controlling motion of a robot during a fall in accordance with an embodiment of the invention.

FIG. 9 illustrates an embodiment of an execution stage performed by the execution controller 404 of the fall controller 318. The execution controller 404 receives 902 the desired angular velocity in Eqn. (11) from the planning controller 402. Based on the desired angular velocity, the execution controller 404 determines 904 desired joint accelerations and desired GRF. The execution controller 908 then determines 906 joint torques to realize the desired joint accelerations and the desired GRF. A control signal is then generated 908 to control actuators of the robot based on the joint torques. The governing equations for carrying out these steps are described below.

Governing Equations

The relation between GRF at the contact point and the rate of change of net spatial momenta are as follows:

$$\dot{k} = K\ddot{q} + \dot{K}\dot{q} = GP \times f \quad (12)$$

$$\dot{l} = L\ddot{q} + \dot{L}\dot{q} = f + mg, \quad (13)$$

where f is GRF, l is linear momentum, m is the total robot mass, g is the gravity vector, and GP is the lean line which connects the CoM and the CoP. Eqn. (12) is obtained by differentiating Eqn. (1). The matrix $L \in \mathbb{R}^{3 \times (n+6)}$ transforms the generalized velocity vector to linear momentum, i.e., $l = L\dot{q}$.

Additionally, if the robot is to keep contact with the ground (i.e., the CoP does not move), the following kinematic constraint is maintained:

$$\dot{P} = J\dot{q} + 0, \quad (14)$$

where $J = dP/dq$. The time differentiation is given by:

$$0 = J\ddot{q} + \dot{J}\dot{q} \quad (15)$$

As in Eqn. (2), $\ddot{q}$ is split into the angular and linear accelerations of the base frame $(\dot{\omega}, \dot{v})$ and the joint accelerations $\ddot{\theta}$. Then Eqns. (12), (13), and (15) can be rewritten respectively as:

$$K_w \dot{\omega} + K_v \dot{v} + K_\theta \ddot{\theta} + \dot{K}\dot{q} = GP \times f \quad (16)$$

$$L_w \dot{\omega} + L_v \dot{v} + L_\theta \ddot{\theta} + \dot{L}\dot{q} = f + mg \quad (17)$$

$$J_w \dot{\omega} + J_v \dot{v} + J_\theta \ddot{\theta} + \dot{J}\dot{q} = 0 \quad (18)$$

If $\omega$, $v$, and Eqns. (16)-(18) with respect to the spin frame, the angular and linear accelerations become decoupled, i.e., $K_v = L_w = 0$. Also, $J_v$ and $L_v$ become identity matrices, and $J_w = -[GP]$ where $[\cdot]$ denotes a 3×3 skew symmetric matrix representing a vector cross product as in $[a]b = a \times b$. This gives:

$$K_w \dot{\omega} + K_\theta \ddot{\theta} + \dot{K}\dot{q} = GP \times f \quad (19)$$

$$m\dot{v} + L_\theta \ddot{\theta} + \dot{L}\dot{q} = f + mg \quad (20)$$

$$-GP \times \dot{\omega} + \dot{v} + J_\theta \ddot{\theta} + \dot{J}\dot{q} = 0 \quad (21)$$

$\dot{v}$ may be eliminated by substituting Eqn. (21) into Eqn. (20) to get:

$$GP \times \dot{\omega} + \left(\frac{1}{m}L_\theta - J_\theta\right)\ddot{\theta} + \frac{1}{m}\dot{L}\dot{q} - \dot{J}\dot{q} = \frac{1}{m}f + g \quad (22)$$

Eqns. (19) and (22) show the dynamic coupling among the angular acceleration of the trunk, joint accelerations, and GRF under kinematic constraints. As can be seen, the joint accelerations $\ddot{\theta}$ completely determine both $\dot{\omega}$ and f and it is possible to eliminate f to express $\dot{\omega}$ in terms of only $\ddot{\theta}$. However, it may be desirable to include f in the governing equations because f conveniently describes the constraints (contact force should be inside friction cone) as well as the global linear motion of the robot, i.e., $\ddot{r}_G = f/m + g$ where $r_G$ is CoM.

Fall Control Command

The fall controller's goal is to determine the joint accelerations $\ddot{\theta}$ and the ground reaction force f such that desired orientation of the trunk is achieved at the time of ground impact. The robot obtains the desired value of the rotational acceleration of the trunk $\dot{\omega}_d$, the desired joint accelerations $\ddot{\theta}_d$, and the desired GRF $f_d$ during the planning stage described above. Given the desired values, determining $\ddot{q}$ and f from Eqns. (19) and (22) can be described as a constrained least-squares problem of the form:

$$\min(1-w)\|Ax - b\|^2 + w\|x - x_d\|^2 \text{ s.t. joint limit constraints,} \quad (23)$$

where $$x^T = (\dot{\omega}^T, \ddot{\theta}^T, f^T) \quad (24)$$

$$A = \begin{bmatrix} K_w & K_\theta & -[GP] \\ [GP] & \left(\frac{L_\theta}{m} - J_\theta\right) & -\frac{1}{m}I \end{bmatrix} \quad (25)$$

$$b = \begin{bmatrix} -\dot{K}\dot{q} \\ -\frac{1}{m}\dot{L}\dot{q} + \dot{J}\dot{q} + g \end{bmatrix} \quad (26)$$

In Eq. (24) above, $x_d^T = (\dot{\omega}_d^T, \ddot{\theta}_d^T, f_d^T)$ represents the desired value for x. Since $Ax = b$ is an under-determined problem, an additional cost function is included $\|x - x_d\|^2$ to find the solution close to the desired values $x_d$, with a small weighting factor w (e.g., w=0.01 in one embodiment).

Inequality constraints may be enforced on $\ddot{\theta}$ to satisfy joint limits. This may be done heuristically, e.g., by giving smaller upper bound on a joint acceleration if the joint gets close to the upper limit. The details of setting the components of $x_d$ are as follows.

At each control time step of the execution controller 404, the desired angular acceleration of the trunk $\dot{\omega}_d$ is set as:

$$\dot{\omega}_d = \gamma(\omega_d - \omega), \quad (27)$$

where $\gamma$ is a feedback gain parameter. For example, in one embodiment, $\gamma = 20$. Next, $\ddot{\theta}_d$ and $f_d$ are determined. In one embodiment, $\ddot{\theta}_d$ is set for the arm joints such that the arms follow the prescribed motion (e.g., maintaining the default arm pose). Furthermore, $\ddot{\theta}_d = 0$ for the leg joints to give preference to minimal leg movement. Setting $f_d$ is more involved and has significant effect on the behavior of the fall controller. Setting $f_d$ too high will cause the robot to jump into the air, whereas setting it too low will make it collapse before achieving our control goal. In one embodiment, $f_d$ is set such that the CoM of the robot moves as if the robot were a falling 3D point-mass pendulum. In one embodiment, the position of the point-mass r is set to the CoM of the robot, and the angular velocity $\dot{\phi}$ of the pendulum is set such that the velocity of the point-mass (i.e., $\dot{\phi} \times r$) equals to the normal velocity of the CoM of the robot to the lean line. Then, the desired GRF is set to the GRF of the 3D point-mass pendulum as follows:

$$f_d = -m r \left( \frac{r^T g}{r^T r} + \dot{\phi}^T \dot{\phi} \right), \quad (28)$$

where r=PG. Given $\dot{\omega}_d$, $\ddot{\theta}_d$, and $f_d$, Eqn. (23) can be solved to compute $\ddot{\theta}$ and f, which are then used as inputs for the inverse dynamics to determine joint torques. In one embodiment, a hybrid system dynamics algorithm is used for this purpose.

While the robot is falling, the robot controller controls the support foot so that it maintains a point contact with the ground because edge or planar contact would incur a large friction that will hinder the robot from spinning. To this end, the robot may either flex or extend the support foot if the CoP is not at one of the corners of the foot. The foot is flexed if the CoP is closer to the hill so that the CoP is nudged to the hill, and it is extended if the CoP is closer to the toe so as to push the CoP towards the toe.

Example Fall Trajectory

Figure 10:
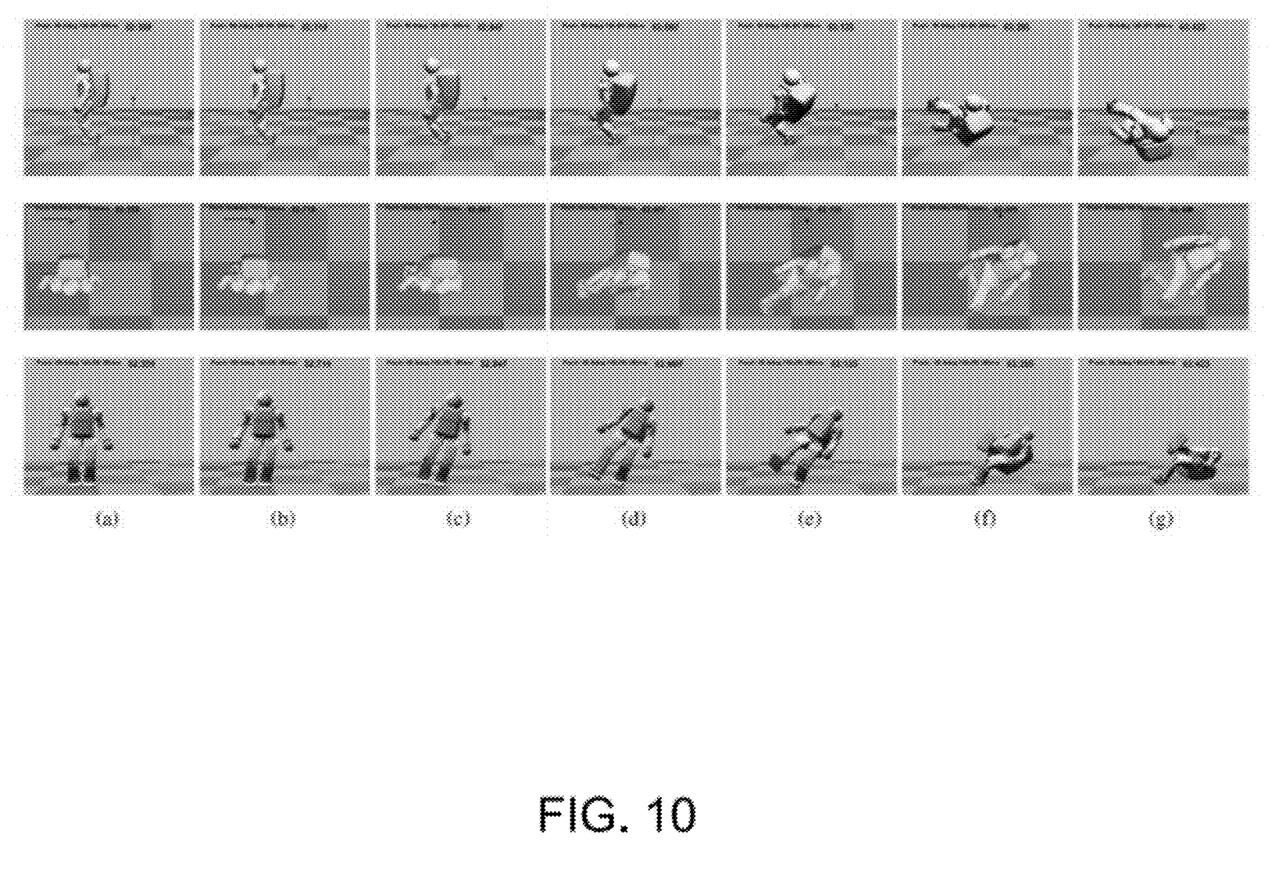
FIG. 10 is a diagram illustrating a fall trajectory of a robot following a push in accordance with an embodiment of the invention.

FIG. 10 shows example progressive snapshots from various angles of the robot's configurations during a falling motion in which the robot uses both the spinning and bending strategies to re-orient itself during a fall following a push. By lifting its swing leg, the robot tries to rotate the trunk counterclockwise about the spin axis and increases the possibility of touchdown with the backpack by rotating the trunk backward. As a result, it successfully touches down with the backpack (FIG. 10(g)). As can be seen, the angular momentum of the swing leg is in the opposite direction to that of the rest of the body. This illustrates how the angular momentum of the body (including trunk) is controlled by counter-rotating the swing leg.

Additional Example Embodiments

In additional alternative embodiments, the range of the robot can be increased by having a waist joint that allows for vertical rotation of the upper body. Alternatively, shock-absorbing materials can be attached to multiple locations of the robot. For example, if the robot has cushioning pads on the knees, the robot will be able to reduce the damage by touching down with knees first when it is falling forward. In order to have multiple target body parts, the robot controller could be configured to first select the optimal target body part and then try to fall with that body part.

In another embodiment, the robot controller can employ a control strategy to avoid collisions with nearby obstacles. For example, the robot controller can utilize an integrated approach that considers reducing the damage to the environment as well as the damage to the robot itself. For example, changing the foot-ground contact configuration can be effective for this purpose. If a robot can step while falling, the robot can change the falling direction and it may also be possible to change the orientation of the trunk. Changing the location of the contact point of the foot, for example from the heel to the toe, may also be useful for controlling the trunk orientation.

Upon reading this disclosure, those of skill in the art will appreciate still additional alternative designs for a robot controller having the features described herein. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A computer-implemented method for controlling a robot during a fall, the method comprising:
    receiving, by a robot controller, a detected state of the robot;
    determining based on the detected state that a fall of the robot is unavoidable;
    responsive to determining that the fall of the robot is unavoidable, determining a desired rotational velocity of the robot that would cause the robot to impact the ground with a predetermined target body segment making first contact with the ground given the detected state of the robot;
    generating a control signal to control motion of the robot during the fall based on the desired rotational velocity; and
    outputting the control signal to actuators of the robot to cause the robot to rotate based on the desired rotational velocity such that the predetermined target body segment makes first contact with the ground.

2. The computer-implemented method of claim 1, wherein determining the desired rotational velocity of the robot comprises:
    estimating a time to a moment of impact of the target body segment with the ground based on the detected state of the robot;
    estimating an orientation of the target body segment at the moment of impact under a locked joint configuration; and
    determining the desired rotational velocity based on the estimated time to the moment of impact and the estimated orientation.

3. The computer-implemented method of claim 2, further comprising:
    adjusting the desired rotational velocity to an admissible velocity based on physical limitations of the robot.

4. The computer-implemented method of claim 1, wherein generating the control signal comprises:
    determining desired joint accelerations and a desired ground reaction force based on the desired rotational velocity;
    determining joint torques for achieving the desired joint accelerations and the desired ground reaction force; and
    generating the control signal to represent the determined joint torques.

5. The computer-implemented method of claim 1, wherein the control signal causes the robot to rotate a swing leg in a rotational direction opposite the desired rotational velocity of the robot, and wherein the control signal causes the robot to bend backwards at the trunk.

6. The computer-implemented method of claim 1, further comprising:
    periodically re-detecting the state of the robot during the fall; and
    periodically updating the determined desired rotational velocity of the robot during the fall based on the re-detected state.

7. The computer-implemented method of claim 6, further comprising:
    periodically re-generating the control signal during the fall based on the periodically updated determined desired rotational velocity, wherein a period for re-generating the control signal is smaller than a period for updating the determined desired rotational velocity; and periodically updating the determined desired rotational velocity of the robot during the fall based on the re-detected state.

8. The computer-implemented method of claim 1, wherein the predetermined body segment comprises a backpack.

9. A non-transitory computer-readable storage medium for storing computer program instructions for controlling a robot during a fall, the program instructions when executed by a processor cause the processor to perform steps including:
   receiving, by a robot controller, a detected state of the robot;
   determining based on the detected state that a fall of the robot is unavoidable;
   responsive to determining that the fall of the robot is unavoidable, determining a desired rotational velocity of the robot that would cause the robot to impact the ground with a predetermined target body segment making first contact with the ground given the detected state of the robot; and
   generating a control signal to control motion of the robot during the fall based on the desired rotational velocity; and
   outputting the control signal to actuators of the robot to cause the robot to rotate based on the desired rotational velocity such that the predetermined target body segment makes first contact with the ground.

10. The non-transitory computer-readable storage medium of claim 9, wherein determining the desired rotational velocity of the robot comprises:
    estimating a time to a moment of impact of the target body segment with the ground based on the detected state of the robot;
    estimating an orientation of the target body segment at the moment of impact under a locked joint configuration; and
    determining the desired rotational velocity based on the estimated time to the moment of impact and the estimated orientation.

11. The non-transitory computer-readable storage medium of claim 10, further comprising:
    adjusting the desired rotational velocity to an admissible velocity based on physical limitations of the robot.

12. The non-transitory computer-readable storage medium of claim 9, wherein generating the control signal comprises:
    determining desired joint accelerations and a desired ground reaction force based on the desired rotational velocity;
    determining joint torques for achieving the desired joint accelerations and the desired ground reaction force; and
    generating the control signal to represent the determined joint torques.

13. The non-transitory computer-readable storage medium method of claim 9, wherein the control signal causes the robot to rotate a swing leg in a rotational direction opposite the desired rotational velocity of the robot, and wherein the control signal causes the robot to bend backwards at the at the trunk.

14. The non-transitory computer-readable storage medium of claim 9, further comprising:
    periodically re-detecting the state of the robot during the fall; and
    periodically updating the determined desired rotational velocity of the robot during the fall based on the re-detected state.

15. The non-transitory computer-readable storage medium of claim 14, further comprising:
    periodically re-generating the control signal during the fall based on the periodically updated determined desired rotational velocity, wherein a period for re-generating the control signal is smaller than a period for updating the determined desired rotational velocity; and
    periodically updating the determined desired rotational velocity of the robot during the fall based on the re-detected state.

16. The non-transitory computer-readable storage medium of claim 9, wherein the predetermined body segment comprises a backpack.

17. A robot controller for controlling a robot during a fall, the robot controller comprising:
    a plurality of sensors determining detecting a state of the robot;
    a high level controller receiving sensed information from the plurality of sensors and determining that a fall of the robot is unavoidable based on the detected state; and
    a fall controller controlling motion of the robot responsive to the high-level controller determining that the fall is unavoidable, the fall controller determining a desired rotational velocity of the robot that would cause the robot to impact the ground with a predetermined target body segment making first contact with the ground given the detected state of the robot, generating a control signal to control motion of the robot during the fall based on the desired rotational velocity, and outputting the control signal to actuators of the robot to cause the robot to rotate based on the desired rotational velocity such that the predetermined target body segment makes first contact with the ground.

18. The robot controller of claim 17, wherein the fall controller is further configured to:
    estimate a time to a moment of impact of the target body segment with the ground based on the detected state of the robot;
    estimate an orientation of the target body segment at the moment of impact under a locked joint configuration; and
    determine the desired rotational velocity based on the estimated time to the moment of impact and the estimated orientation.

19. The robot controller of claim 18, wherein the fall controller is further configured to adjust the desired rotational velocity to an admissible velocity based on physical limitations of the robot.

20. The robot controller of claim 17, wherein the fall controller is further configured to:
    determine desired joint accelerations and a desired ground reaction force based on the desired rotational velocity;
    determine joint torques for achieving the desired joint accelerations and the desired ground reaction force; and
    generate the control signal to represent the determined joint torques.

* * * * *